US009766455B2

(12) United States Patent
Liu

(10) Patent No.: US 9,766,455 B2
(45) Date of Patent: Sep. 19, 2017

(54) HEAD-UP DISPLAY DEVICE

(71) Applicant: DENSO CORPORATION, Kariya, Aichi-pref. (JP)

(72) Inventor: Heng Liu, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/034,119

(22) PCT Filed: Oct. 16, 2014

(86) PCT No.: PCT/JP2014/005240
§ 371 (c)(1),
(2) Date: May 3, 2016

(87) PCT Pub. No.: WO2015/068337
PCT Pub. Date: May 14, 2015

(65) Prior Publication Data
US 2016/0266383 A1    Sep. 15, 2016

(30) Foreign Application Priority Data
Nov. 6, 2013 (JP) .................................. 2013-230563

(51) Int. Cl.
G02B 27/01     (2006.01)
B60K 35/00     (2006.01)

(52) U.S. Cl.
CPC .......... *G02B 27/0101* (2013.01); *B60K 35/00* (2013.01); *G02B 27/01* (2013.01);
(Continued)

(58) Field of Classification Search
CPC  G02B 27/01; G02B 27/0101; G02B 27/0149; G02B 2027/011;
(Continued)

(56) References Cited

U.S. PATENT DOCUMENTS 6,097,543 A * 8/2000 Rallison ............. G02B 27/0172
                                             359/630
6,185,045 B1 * 2/2001 Hanano ............. G02B 27/0172
                                             359/630
(Continued)

FOREIGN PATENT DOCUMENTS

| JP | 2007087792 A | 4/2007 |
| JP | 2009222882 A | 10/2009 |
| JP | 2010039387 A | 2/2010 |

*Primary Examiner* — William R Alexander
(74) *Attorney, Agent, or Firm* — Harness, Dickey & Pierce, P.L.C.

(57) ABSTRACT

A head-up display device that is to be equipped to a moving body and displays an image projected on a projection surface of the moving body to be visually recognized as a virtual image from an inside of the moving body includes a light source, an image displaying panel and a common mirror. The image displaying panel luminously displays an image using a light of the light source passing through a first optical path and projecting the image on the projection surface via a second optical path. The common mirror reflects and leads the light of the light source toward the image displaying panel in the first optical path, and a light of the image toward the projection surface in the second optical path.

6 Claims, 4 Drawing Sheets

(52) U.S. Cl.
CPC ...... *G02B 27/0149* (2013.01); *B60K 2350/20* (2013.01); *G02B 2027/011* (2013.01); *G02B 2027/0112* (2013.01); *G02B 2027/0118* (2013.01); *G02B 2027/0152* (2013.01); *G02B 2027/0154* (2013.01)

(58) Field of Classification Search
CPC .... G02B 2027/0112; G02B 2027/0118; G02B 2027/0152; G02B 2027/0154; B60K 35/00; B60K 2350/20
USPC ........ 359/633, 629, 13, 14, 15, 16, 630, 631
See application file for complete search history.

(56) References Cited

U.S. PATENT DOCUMENTS

| | | | | |
|---|---|---|---|---|
| 6,504,518 | B1* | 1/2003 | Kuwayama | G02B 27/01 340/980 |
| 7,042,637 | B2* | 5/2006 | Mukawa | G03B 21/005 345/102 |
| 2007/0064174 | A1 | 3/2007 | Kitamura et al. | |
| 2007/0103747 | A1* | 5/2007 | Powell | G02B 13/22 359/13 |
| 2009/0243963 | A1* | 10/2009 | Hotta | G02B 27/0093 345/7 |
| 2011/0122049 | A1* | 5/2011 | Lvovskiy | G02B 27/0101 345/1.3 |
| 2013/0182197 | A1* | 7/2013 | Ludewig | G02B 27/0101 349/11 |
| 2013/0194674 | A1* | 8/2013 | Horiuchi | G02B 27/0101 359/631 |
| 2013/0265646 | A1* | 10/2013 | Sakai | G02B 27/01 359/631 |

* cited by examiner

HEAD-UP DISPLAY DEVICE

CROSS REFERENCE TO RELATED APPLICATIONS

This application is a U.S. National Phase Application under 35 U.S.C. 371 of International Application No. PCT/JP2014/005240 filed on Oct. 16, 2014 and published in Japanese as WO 2015/068337 A1 on May 14, 2015. This application is based on and claims the benefit of priority from Japanese Patent Application No. 2013-230563 filed on Nov. 6, 2013. The entire disclosures of all of the above applications are incorporated herein by reference.

TECHNICAL FIELD

The present disclosure relates to a head-up display device (hereinafter, referred to as a HUD device) that is equipped to a moving body.

BACKGROUND ART

It has been conventionally known a HUD device equipped to a moving body and projecting an image on a projection surface of the moving body so that the image can be visually recognized as a virtual image from an inside of the moving body. In a first optical path disclosed in patent literature 1, a backlight, a projecting lens and an image displaying panel are arranged as an indicator. The backlight includes a light source emitting a light, a condensing lens and a diffusing board. The image displaying panel is a liquid crystal panel. The image displaying panel luminously displays an image by using a light of the light source having passed through a first optical path and projects the image on a projection surface via a second optical path.

However, since a mirror is not arranged in the first optical path of a HUD device disclosed in the patent literature 1, the first optical path has to be formed in a straight line. Therefore, when the HUD device is equipped to the moving body such as a vehicle, it is difficult to secure a sufficient geometrical distance in a limited space. In such a first optical path, a projecting lens with a short focal distance has to be arranged close to the light source. As a result, the light of the light source enters the liquid crystal panel with an uneven illuminance before the light spreads to an entire of a screen of the liquid crystal panel, and thereby to cause an uneven luminance in the image displayed on the liquid crystal panel.

On the other hand, when plural mirrors are arranged in the first optical path, a size of the HUD device is enlarged as the number of the mirrors increases, and it is difficult to equip the HUD device to the moving body such as a vehicle.

PRIOR ART LITERATURE

Patent Literature

Patent literature 1: JP 2010-39387 A

SUMMARY OF INVENTION

It is an object of the present disclosure to provide a HUD device that can restrict an uneven luminance, and that is miniaturized.

According to an aspect of the present disclosure, a head-up display device is formed to be equipped to a moving body and to display an image projected on a projection surface of the moving body to be visually recognized as a virtual image from an inside of the moving body, and the head-up display device includes a light source emitting a light, an image displaying panel and a common mirror. The image displaying panel luminously displays an image using the light of the light source passing through a first optical path and projects the image on the projection surface via a second optical path. The common mirror reflects and leads the light of the light source toward the image displaying panel in the first optical path, and a light of the image toward the projection surface in the second optical path.

In the HUD device, since the common mirror reflects and leads the light of the light source toward the image displaying panel, a geometrical distance along the first optical path can be secured. Furthermore, since the common mirror is shared by the first optical path and the second optical path, enlargement of the HUD device due to an increase of the number of mirrors can be restricted.

BRIEF DESCRIPTION OF DRAWINGS

The above and other objects, features and advantages of the present disclosure will become more apparent from the following detailed description made with reference to the accompanying drawings, in which.

DESCRIPTION OF EMBODIMENTS

Hereinafter, an embodiment of the present disclosure will be described with reference to the drawings.

Figure 1:
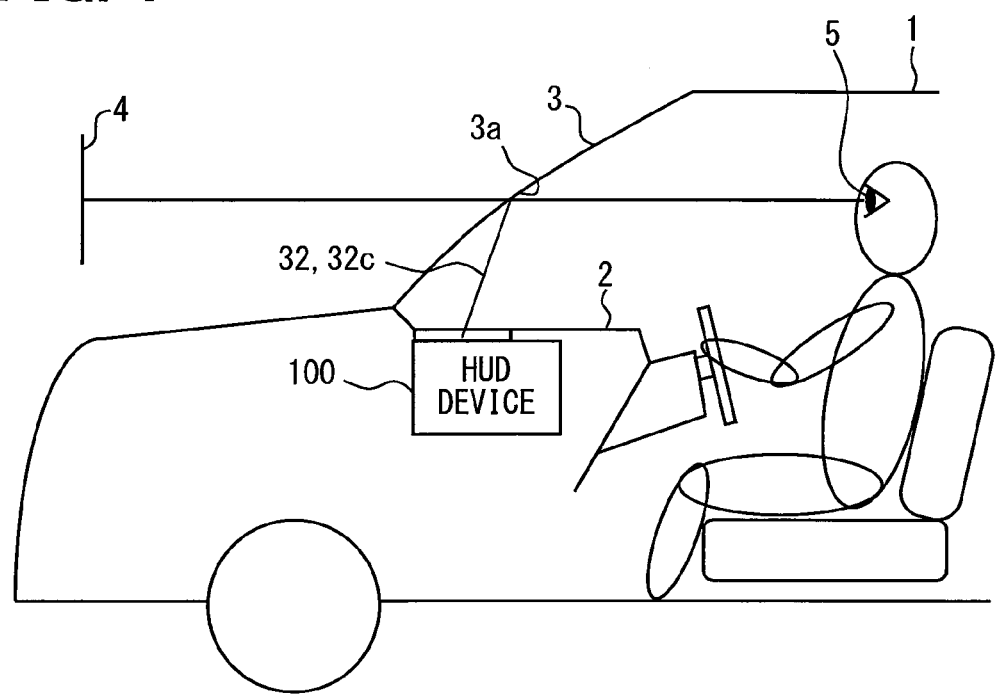
FIG. 1 is a schematic diagram illustrating a state in which a HUD device is equipped to a moving body according to an embodiment of the present disclosure.

As shown in FIG. 1, a head-up display device (HUD device) 100 according to the embodiment of the present disclosure is equipped to a vehicle 1, which is an example of a moving body, and is accommodated in an instrument panel 2. The HUD device 100 projects an image on a windshield 3, which is a displaying member of the vehicle 1. The HUD device 100 allows a crew of the vehicle 1 (hereinafter, vehicle crew) to visually recognize the image as a virtual image 4 from an inside of the vehicle 1. That is, a light reflected on the windshield 3 reaches an eye point 5 of the vehicle crew, and the vehicle crew perceives the light having reached the eye point 5. As such, the vehicle crew can recognize a value indicating a vehicle state such as a vehicle speed or a remaining fuel amount, or vehicle information such as road information, safety information, or view supporting information.

An inner surface of the windshield 3 inside of the vehicle 1 has a projection surface 3a on which the image is projected. The projection surface 3a is a curved concave surface or a flat surface. In general, the shape of the windshield 3 described above is chosen by vehicle makers based on a use or a design of the vehicle 1. In the windshield 3 of the vehicle 1, the inner surface and an outer surface of the windshield 3 may have a difference of an angle. The windshield 3 may be provided by disposing a vapor deposited film or a film on the projection surface 3a. A combiner, which is a displaying member separated from the vehicle 1, may be provided in the vehicle 1 instead of the windshield 3, and the image may be projected on a projection surface of the combiner.

A specific structure of the HUD device 100 will be hereinafter described with reference to FIG. 2 to FIG. 6. The HUD device 100 includes a light source 10, a lens array 12, a common mirror 14, a concave mirror 16, a plane mirror 18, an image displaying panel 20 and an aspheric mirror 22.

Figure 2:
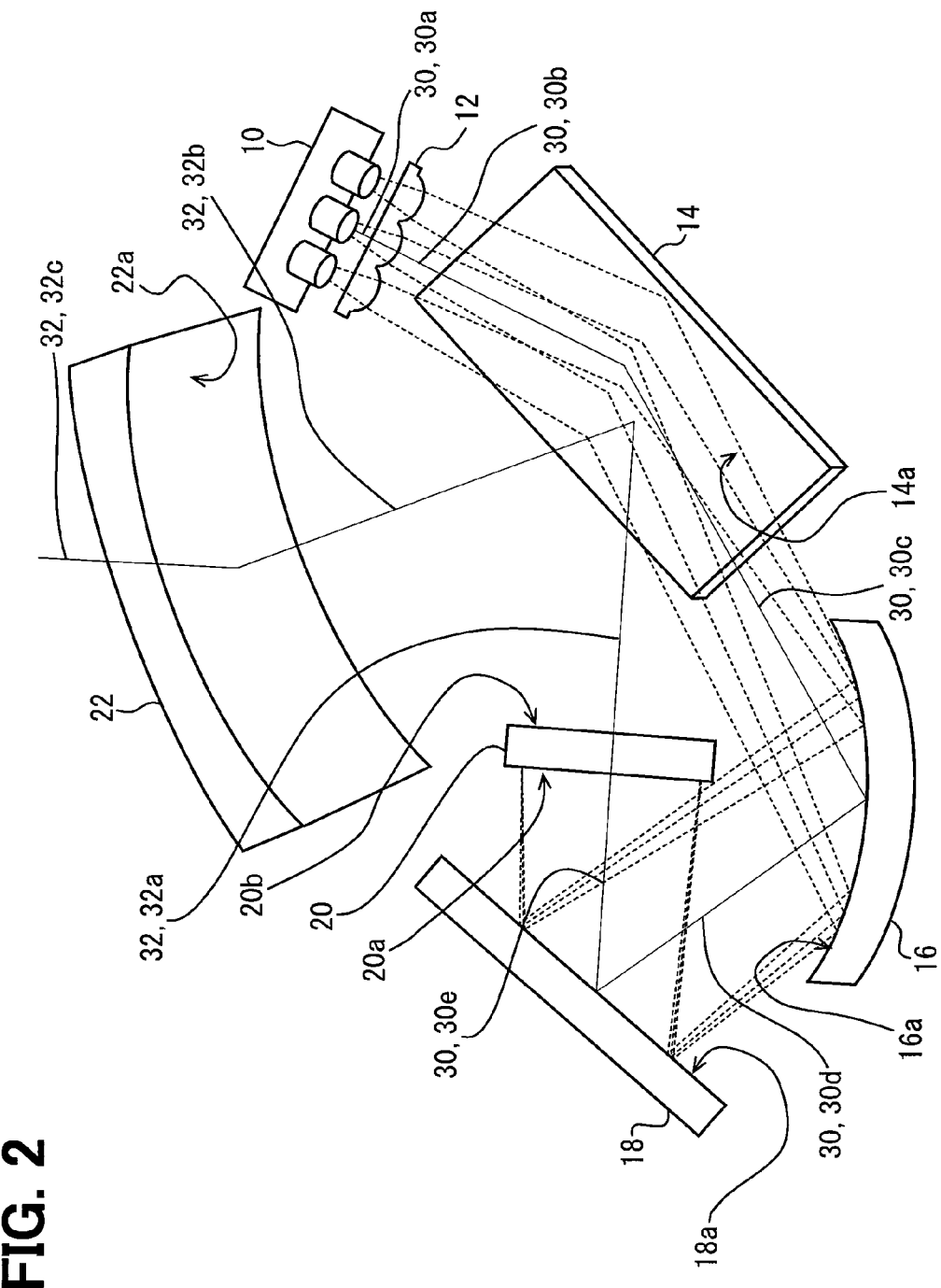
FIG. 2 is a schematic diagram illustrating a structure of the HUD device, a first optical path and a second optical path according to the embodiment of the present disclosure.

As shown in FIG. 2, the light source 10 is a light emitting diode (LED) array including LEDs 10a. Especially, in the present embodiment, three LEDs 10a are arranged in a line and at equal intervals on a circuit board 10b for the light source. The LEDs 10a are electrically connected to a power source (not illustrated) through a wiring pattern (not illustrated) provided on the circuit board 10b for the light source. When the LEDs 10a are energized, the LEDs 10a emit white light to form an optical path 30a from the light source 10 to the lens array 12. Especially in the present embodiment, the LEDs 10a are blue LEDs covered with fluorescent materials to emit pseudo-white light.

The lens array 12 includes convex lenses 12a. The convex lenses 12a are arranged in a direction in which the LEDs 10a are arranged in the LED array. The convex lenses 12a are integrated with each other. More specifically, each of the convex lenses 12a is made of synthetic resin or glass. The convex lens 12a is a plano-convex lens having an incident surface 12b adjacent to the light source 10 and an emission surface 12c. The incident surface 12b has a smooth planar shape and the emission surface 12c has a smooth convex shape. The convex lens 12a projects an incident light from the corresponding LED 10a on the common mirror 14 to form an optical path 30b from the lens array 12 to the common mirror 14.

Figure 3:
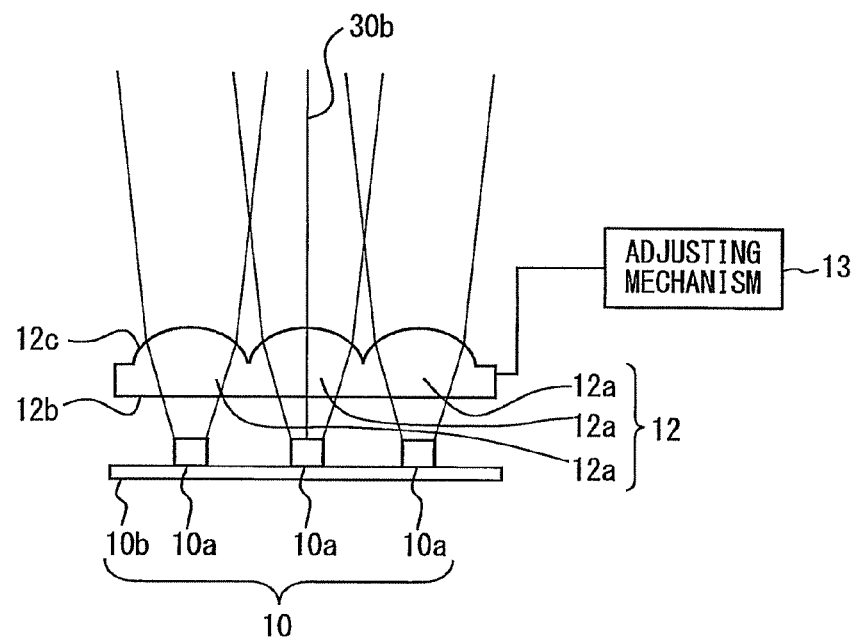
FIG. 3 is a schematic diagram for explaining an adjusting mechanism, in a normal position, of the embodiment of the present disclosure.
Figure 4:
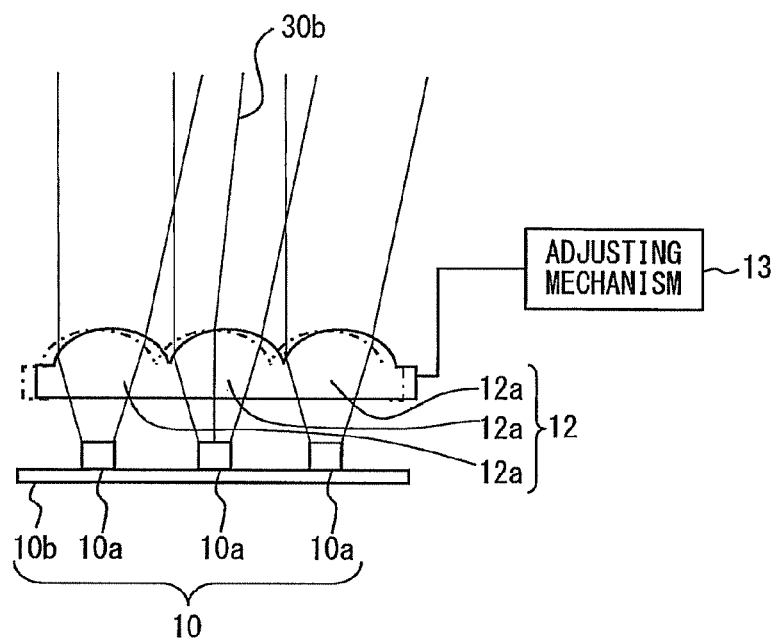
FIG. 4 is a schematic diagram for explaining the adjusting mechanism, in a position after the adjustment, of the embodiment of the present disclosure.

The lens array 12 has an adjusting mechanism 13. The adjusting mechanism 13 is electrically connected to an outer controller (not illustrated). The adjusting mechanism 13 adjusts positions of the convex lenses 12a of the lens array 12 based on a driving signal received from the outer controller. In details, as shown in FIG. 3 and FIG. 4, the adjusting mechanism 13 slightly moves the convex lenses 12a on a surface along the direction in which the convex lenses 12a are arranged (or in a direction substantially perpendicular to the optical path 30a). As such, the adjusting mechanism 13 adjusts positions of the convex lenses 12a with respect to the light emitted from the light source 10.

As shown in FIG. 2, the common mirror 14 has a base made of synthetic resin or glass. A surface of the base is vacuum-plated with aluminum to form a reflection surface 14a. Especially, the common mirror 14 of the present disclosure is a plane mirror having a smooth planar reflection surface 14a. The common mirror 14 reflects the light from the lens array 12 so that a direction of the light is changed toward the concave mirror 16 to form an optical path 30c from the common mirror 14 to the concave mirror 16.

The concave mirror 16 has a base made of synthetic resin or glass. A surface of the base is vacuum-plated with aluminum to form a reflection surface 16a. The reflection surface 16a has a smooth concave shape. The concave mirror 16 reflects the light from the common mirror 14 so that a direction of the light is changed toward the plane mirror 18 to form an optical path 30d from the concave mirror 16 to the plane mirror 18.

The plane mirror 18 has a base made of synthetic resin or glass. A surface of the base is vacuum-plated with aluminum to form a reflection surface 18a. The reflection surface 18a has a smooth planar shape. The plane mirror 18 reflects the light from the concave mirror 16 so that a direction of the light is changed toward the image displaying panel 20. The plane mirror 18 is arranged opposing to the image displaying panel 20 and inclining with respect to a direction normal to the image displaying panel 20 so that the light reflected on the plane mirror 18 is illuminated in the direction normal to the image displaying panel 20. As such, an optical path 30e from the plane mirror 18 to the image displaying panel 20 is formed.

Figure 5:
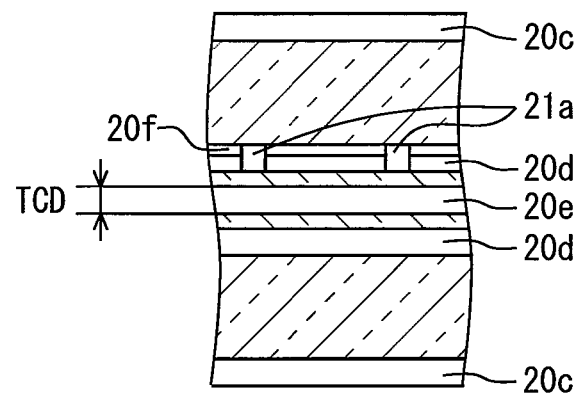
FIG. 5 is a cross-sectional view schematically illustrating a part of an image displaying panel according to the embodiment of the present disclosure.
Figure 6:
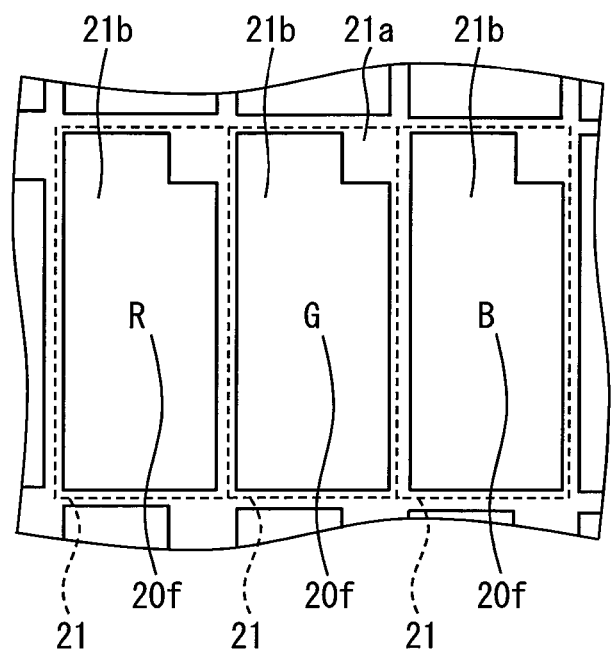
FIG. 6 is a front view schematically illustrating liquid crystal pixels of the image displaying panel of the embodiment of the present disclosure.

As shown in FIG. 5 and FIG. 6, the image displaying panel 20 is a transmissive liquid crystal panel that forms an image by transmitting a light illuminated on an incident surface 20a and luminously displays the image from an emission surface 20b. In more details, the image displaying panel 20 is a dot-matrix thin film transistor (TFT) liquid crystal panel including plural liquid crystal pixels 21 arranged two-dimensionally. The image displaying panel 20 includes a pair of polarizing plates 20c, a pair of transparent electrodes 20d between the polarizing plates 20c, a liquid crystal layer 20e between the transparent electrodes 20d and a color filter 20f. The polarizing plates 20c, the transparent electrodes 20d, liquid crystal layer 20e and the color filter 20f are laminated in the image displaying panel 20.

The polarizing plate 20c has a property that passes an incident light polarized in x direction and blocks a light polarized in y direction. For example, the pair of polarizing plates 20c are arranged substantially perpendicular to the x direction. The pair of transparent electrodes 20d is electrically connected to the outer controller through wiring portions 21a. A voltage can be applied between the transparent electrodes 20d based on an electric signal of the outer controller.

The liquid crystal layer 20e is filled with a solution having liquid crystal molecules such as a nematic liquid crystal as a main component. In the liquid crystal layer 20e, directions of the liquid crystal molecules are controlled by the voltage applied between the pair of transparent electrodes 20d. A direction of the polarization of the incident light incident on the liquid crystal layer 20e can be changed based on the voltage applied between the pair of transparent electrodes 20d. A thickness TLC of the liquid crystal layer 20e is set so that the polarization direction of the light entering the liquid crystal layer 20e along the normal direction of the liquid crystal layer 20e and passing through the liquid crystal layer 20e is rotated by 90 degree, in a case where a prescribed voltage corresponding to a maximum transmittance (for example, 0 V) is applied.

Each liquid crystal pixel 21 has a wiring portion 21a that does not form the image, and an opening portion 21b that is surrounded by the wiring portion 21a and forms the image. The color filters 20f are assigned to, for example, any one of RGB in each liquid crystal pixel 21.

According to the structure, in each of the liquid crystal pixels 21, the transmittance of the light emitted by the light source can be controlled by controlling the voltage applied. As such the image displaying panel 20 can luminously display the image as the light of the image. As shown in FIG. 2, the light luminously displayed by the image displaying panel 20 proceeds to the common mirror 14 to form an optical path 32a from the image displaying panel 20 to the common mirror 14. The common mirror 14 reflects the light from the image displaying panel 20 so that a direction of the light is changed toward the aspheric mirror 22 to form an optical path 32b from the common mirror 14 to the aspheric mirror 22.

The aspheric mirror 22 has a base made of synthetic resin or glass. A surface of the base is vacuum-plated with aluminum to form a reflection surface 22a. The aspheric mirror 22 reflects the light from the common mirror 14 so that a direction of the light is changed toward the windshield 3 to form an optical path 32c from the aspheric mirror 22 to the windshield 3. The reflection surface 22a has a smooth concave shape. The reflection surface 22a has an aspheric shape corresponding to a shape of the projection surface 3a so as to restrict an aberration, which is mainly a distortion aberration occurring in the image projected on the projection surface 3a of the windshield 3 of the vehicle 1.

In the above structure, a first optical path 30 from the light source 10 to the image displaying panel 20 through the lens array 12, the common mirror 14, the concave mirror 16 and the plane mirror 18 is formed. The image displaying panel 20 is illuminated by the light of the light source 10 that has passed through the first optical path 30. In other words, the first optical path 30 includes the optical paths 30a, 30b, 30c, 30d and 30e.

An illumination range of the light to illuminate the image displaying panel 20 is set in the first optical path 30 so that a broad range of the incident surface 20a of the image displaying panel 20 can be illuminated by light fluxes of the light of the LEDs 10a. An emitting angle of each light flux to be emitted to the image displaying panel 20 is adjusted in the first optical path 30 so that a difference between an angle of the light incident on a point of the incident surface 20a and an angle of the light incident on another point of the incident surface 20a is decreased.

Especially in the present embodiment, the lens array 12 in the first optical path 30 mainly functions as an adjusting component that adjusts the illumination range of the light to illuminate the image displaying panel 20. A diameter of the light flux emitted from the lens array 12 expands as the light flux proceeds along the first optical path 30. The diameter of the light flux having passed through the common mirror 14 further expands and the light flux enters the concave mirror 16. The concave mirror 16 in the first optical path 30 mainly functions as an adjusting member that adjusts the emitting angle of the expanded light flux to be emitted to the image displaying panel 20. In FIG. 2, the light fluxes proceeding the first optical path 30 are schematically illustrated by broken lines.

A second optical path 32 from the image displaying panel 20 to the projection surface 3a of the windshield 3 through the common mirror 14 and the aspheric mirror 22 is formed. The image displaying panel 20 projects the image that is luminously displayed on the projection surface 3a via the second optical path 32. In other words, the second optical path 32 includes the optical paths 32a, 32b and 32c.

The common mirror 14 is shared by the first optical path 30 and the second optical path 32. In the first optical path 30, the common mirror 14 reflects and leads the light emitted from the light source 10 toward the image displaying panel 20. In the second optical path 32, the common mirror 14 reflects and leads the light of the image towards the projection surface 3a.

The first optical path 30 and the second optical path 32 are formed so that the light of the light source 10 in the first optical path 30 and the light of the image in the second optical path 32 do not interfere each other on the common mirror 14. Specifically, a direction of the light flux of the first optical path 30 incident on the reflection surface 14a, a direction of the light flux of the first optical path 30 reflected on the reflection surface 14a, a direction of the light flux of the second optical path 32 incident on the reflection surface 14a and a direction of the light flux of the second optical path 32 reflected on the reflection surface 14a are set so as not to overlap each other. The lens array 12 as a range setting member is disposed between the light source 10 and the common mirror 14 of the first optical path 30 of the present embodiment. The concave mirror 16 as an angle setting member is disposed between the common mirror 14 and the image displaying panel 20 of the first optical path 30.

If the aspheric mirror 22 of the mirrors 14 and 22 of the second optical path 32 is used as a common mirror, uneven illuminance occurs when the aspheric mirror 22 reflects the light of the light source 10 and leads the light toward the image displaying panel 20 in the first optical path 30. Therefore, the mirror having the planar shape is used as the common mirror 14.

Hereinafter, effects of the present embodiment will be described.

Since the HUD device 100 of the present embodiment is equipped in a limited space of the vehicle 1, miniaturization of the HUD device 100 is required. The image displaying panel 20 luminously displays the image by using the light of the light source 10 having passed through the first optical path 30 and projects the image on the projection surface 3a via the second optical path 32. In order to restrict the uneven luminance of the image, the uneven illuminance of the light on the image displaying panel 20 needs to be restricted. Since the mirror reflecting and leading the light of the light source 10 toward the image displaying panel 20 is provided in the first optical path 30, a geometrical distance along the first optical path 30 can be secured. Since the common mirror 14 is shared by the first optical path 30 and the second optical path 32, enlargement of the HUD device 100 due to an increase of the number of mirrors can be restricted. Accordingly, the HUD device 100 that can restrict the uneven luminance and that is miniaturized can be provided.

According to the present embodiment, the polarization direction of the light that is illuminated along the direction normal to the image displaying panel 20, which is the transmissive liquid crystal panel, can be correctly controlled in the liquid crystal medium. As a result, a decrease in contrast and a change of a color tone can be restricted.

According to the present embodiment, the lens array 12 setting the illumination range is disposed between the light source 10 and the common mirror 14, and the concave mirror 16 setting the emitting angle is disposed between the common mirror 14 and the image displaying panel 20. The common mirror 14 is disposed at a position of the first optical path 30 in which the diameter of the light flux of the first optical path 30 is increasing, so that the light of the light source 10 enters the common mirror 14 and is reflected on the common mirror 14 while the diameter of the light flux of the first optical path 30 is increasing. That is, the common mirror 14 is disposed at the position of the first optical path 30 in which the diameter of the light flux of the first optical path 30 is still small. As a result, the directions of the incidents and the directions of the reflections of the light of the light source 10 and the light of the image on the common mirror 14 can be restricted from overlapping each other.

According to the present embodiment, the adjusting mechanism 13 adjusts the position of the lens array 12 disposed between the light source 10 and the common mirror 14 in the first optical path 30. When an error of the arrangement of the common mirror 14 occurs and the illumination range is displaced, the adjusting mechanism 13 can correct the displacement of the illumination range while restricting the effects on the projection in the second optical path 32.

According to the present embodiment, the common mirror 14 having a planar shape and simple structure can secure the geometrical distance of the optical paths 30 and 32 while restricting the effects on the illuminance and the projection of the optical paths 30 and 32. As a result, the HUD device 100 that can restrict the uneven luminance and that is miniaturized can be easily produced.

Other Embodiment

Although the embodiment of the present disclosure is described above, the present disclosure is not limited to the embodiment and may be implemented in various other ways without departing from the gist of the present disclosure.

Specifically, in a modification 1, one LED 10a may be used as the light source 10. A lump such as a mercury lamp, other than the LED 10a, may be used as the light source 10.

In a modification 2, the image displaying panel 20 may be a transmissive liquid crystal panel of other form. Also, the image displaying panel 20 is not limited to the transmissive liquid crystal panel and may be a reflective liquid crystal panel or the like.

In a modification 3, an order of optical components 12, 14, 16 and 18, such as mirrors, forming the first optical path 30 and the second optical path 32 is not limited to the order described in the embodiment. The mirrors 16, 18 and 22 other than the mirror 14 may be substituted by a lens. An optical component such as a mirror, a lens or a prism may be added to the HUD device 100.

In a modification 4, the HUD device 100 does not have to include the adjusting mechanism 13.

In a modification 5, the reflection surface 14a of the common mirror 14 may have a shape other than the planar shape, such as a convex shape.

In a modification 6, the aspheric mirror 22 may have a moving mechanism that moves the aspheric mirror 22 so that a position of image formation is moved in a vertical direction.

In a modification 7, the present disclosure may be employed to a moving body (transportation equipment) such as a vessel or an airplane.

What is claimed is:

1. A head-up display device to be equipped to a moving body and displaying an image projected on a projection surface of the moving body to be visually recognized as a virtual image from an inside of the moving body, the head-up display comprising:

a light source emitting a light;

an image displaying panel luminously displaying an image using the light of the light source passing through a first optical path and projecting the image on the projection surface via a second optical path; and a common mirror reflecting and leading the light of the light source toward the image displaying panel in the first optical path, and reflecting and leading a light of the image toward the projection surface in the second optical path.

2. The head-up display device according to claim 1, wherein the image displaying panel is a transmissive liquid crystal panel, and the image displaying panel is illuminated in a direction normal to the image displaying panel.

3. The head-up display device according to claim 1, further comprising:

a range setting member disposed between the light source and the common mirror in the first optical path and setting an illumination range to illuminate the image displaying panel; and an angle setting member disposed between the common mirror and the image displaying panel in the first optical path and setting an emitting angle of a light to be emitted to the image displaying panel.

4. The head-up display device according to claim 1, further comprising:

a range setting member disposed between the light source and the common mirror in the first optical path and setting an illumination range to illuminate the image displaying panel; and an adjusting mechanism adjusting a position of the range setting member.

5. The head-up display device according to claim 1, wherein the common mirror is a plane mirror.

6. The head-up display device according to claim 1, further comprising:

a range setting member disposed between the light source and the common mirror in the first optical path and setting an illumination range to illuminate the image displaying panel;

an adjusting mechanism adjusting a position of the range setting member; and an angle setting member disposed between the common mirror and the image displaying panel in the first optical path and setting an emitting angle of a light to be emitted to the image displaying panel.

\* \* \* \* \*